Jan. 14, 1958 C. E. LARSON 2,819,627
DUAL BRAKE CONTROLS

Filed July 11, 1955 2 Sheets-Sheet 1

INVENTOR.
Clifford E. Larson
BY Cullen & Cantor
Attorneys.

Jan. 14, 1958 C. E. LARSON 2,819,627
DUAL BRAKE CONTROLS
Filed July 11, 1955 2 Sheets-Sheet 2

INVENTOR.
Clifford E. Larson
BY Cullen & Cantor
Attorneys

United States Patent Office 2,819,627
Patented Jan. 14, 1958

2,819,627
DUAL BRAKE CONTROLS

Clifford E. Larson, Detroit, Mich., assignor to Saul Rose, Detroit, Mich.

Application July 11, 1955, Serial No. 521,133
1 Claim. (Cl. 74—562.5)

This application relates to dual brake controls and aims particularly to provide a portable or loosely mounted and removable auxiliary mechanism for controlling the use of the foot brake of an automobile.

The object of the present invention is to provide a simple portable dual brake control which can be easily and quickly installed in and removed from a car without marking or disfiguring the car in any way.

For an understanding of the invention, reference should be had to the appended drawings, which disclose a preferred embodiment.

Figure 2:
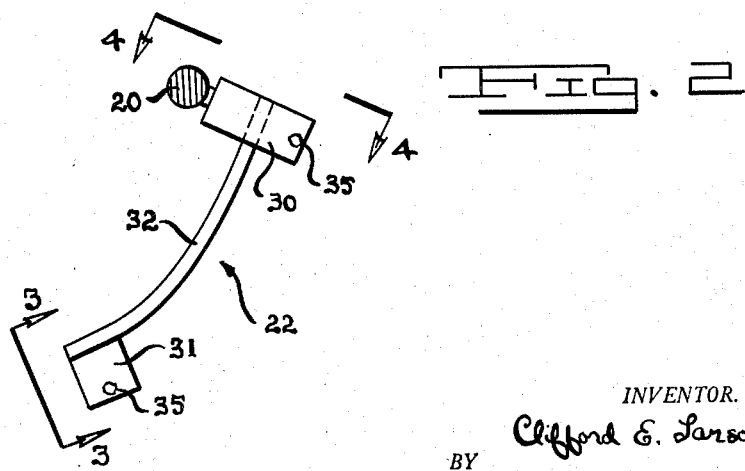
Fig. 2 is a transverse section view at the left end of a shaft forming part of the control means, and is a section as if on line 2—2 of Fig. 1.
Figures 3, 4, 5, 6:
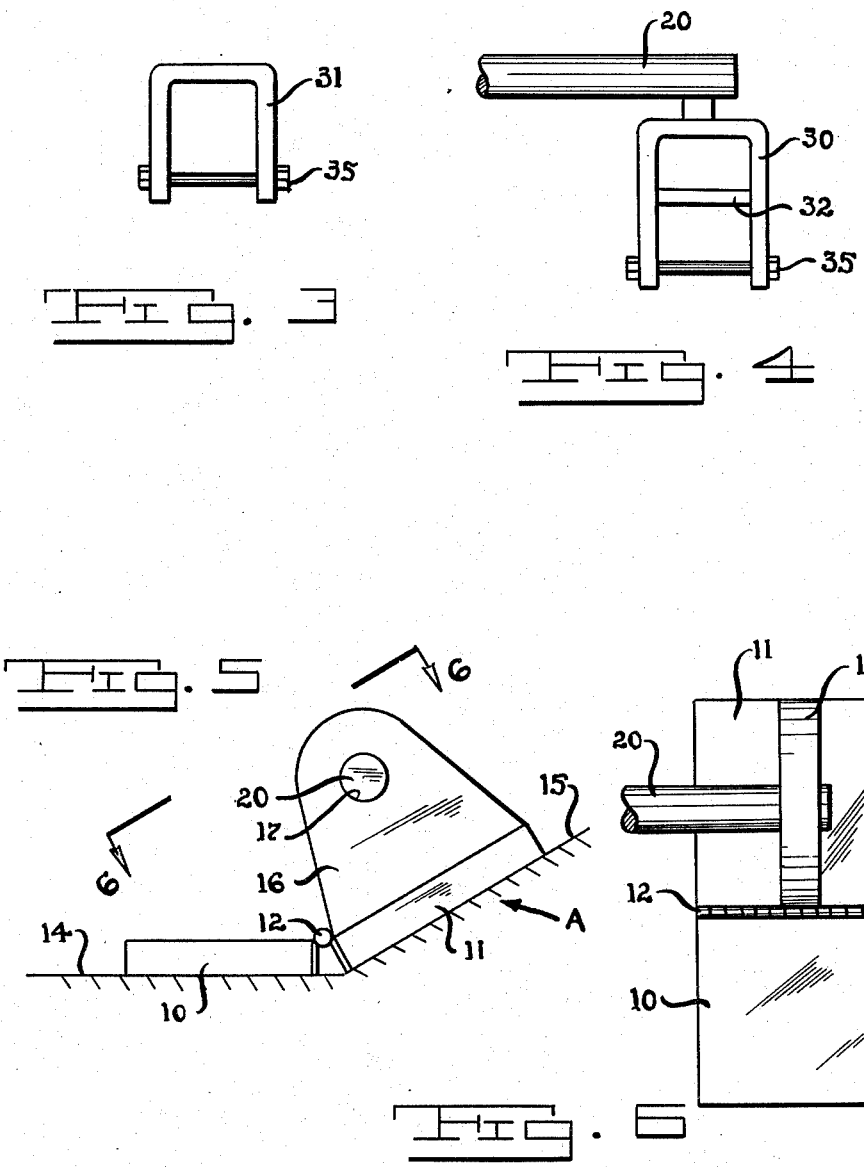

Figs. 3 and 4 are side views as if on lines 3—3 and 4—4 of Fig. 2, respectively.

Figure 1:
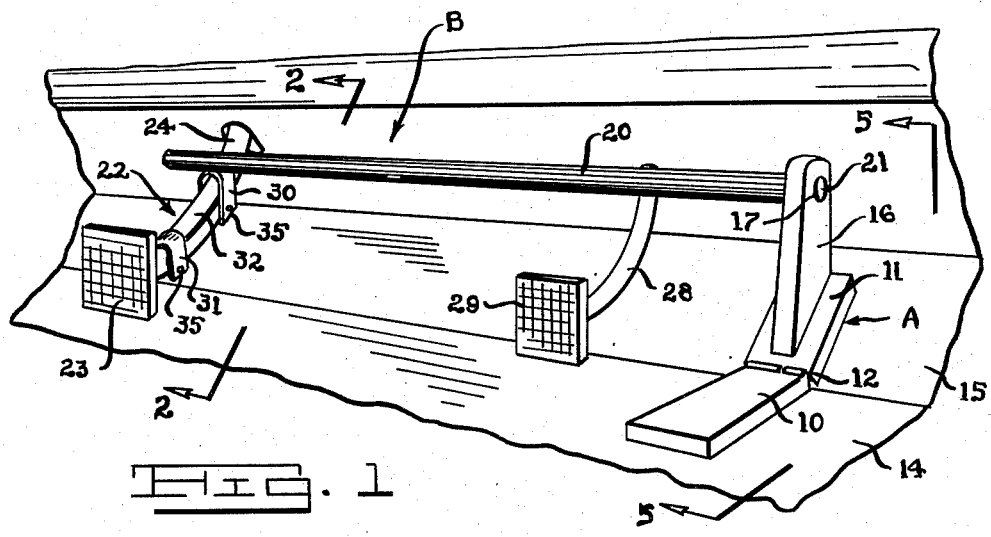
Fig. 1 is a view of the interior of an automobile showing the dual brake control in mounted and operative position.

Fig. 5 is a side view as if on line 5—5 of Fig. 1.

Fig. 6 is a view as if on line 6—6 of Fig. 5.

Referring to the drawings, it will be observed that Fig. 1 shows a control device for an automobile comprising two separate units, A and B.

These units are completely separate and are separately assembled in the automobile.

The unit A is a base unit which includes two heavy plates 10 and 11 connected by a hinge 12. Plate 10 is adapted to rest on the horizontal floor 14 of an automobile. Plate 11 is adapted to rest on the inclined floorboard 15, with the hinge 12 being at the intersection of the floor parts 14 and 15.

Plate 11 is formed with a vertical plane bracket 16 provided with a transverse or horizontal hole 17.

The unit B is an operating unit and includes an elongated shaft 20 having a plain right end 21 adapted to be received and thus fulcrumed in the hole 17 of the bracket 16. Shaft 20 also has a left end formed with a means 22 for detachably clamping the left end of the shaft 20 to a conventional brake pedal 23 having a stem 24. Thus, when the end 21 is in the bracket hole 17 and the bracket 17 rests in place on the automobile floor and when the left end of the shaft 20 is clamped by the means 22 to the brake pedal stem 24, the shaft 20 may be pressed down by a passenger for moving the brake pedal 23 for braking.

Near the right end of the shaft 20 is a stem 28 formed with an auxiliary pedal 29 for better enabling the passenger to press down on the shaft 20 for braking. The pedal 29, while near the right end 21 of the shaft 20, is to the left of the bracket 17 when the device is properly mounted.

The means 22 for clamping the left end of the shaft 20 to the brake pedal stem 24 comprises two U-shaped stirrups 30 and 31, connected by a heavy rigid strap 32. Stirrup 30 is connected directly to shaft 20. The two stirrups receive the brake pedal stem 24 and transverse bolts 35 are supplied for clamping stirrups 30—31 to the stem.

The entire apparatus is attached to the car, first, by positioning the unit A in its proper position on the floor boards, and second, by positioning the right end of the shaft in the hole 17 of the bracket in proper adjusted position where the stirrups receive the brake stem, and third, by fitting the stirrups to the brake stem and manipulating the clamping bolts in the stirrups for detachably securing these stirrups to the brake stem. This completes the assembly.

Disassembly is effected reversely.

The two separate units A and B are handled and mounted and assembled and disassembled separately, but once assembled in a car, they function together for the purposes described.

The entire device may be easily and quickly installed and removed from a car without marking or disfiguring it in any way.

It is observed that while the pedal stem 24 to which the pedal stem connector 22 at the left end of the shaft 20 may be connected has heretofore been described as the brake pedal, it may actually be the clutch pedal in conventional manual shift automobiles with the result that movement of the auxiliary pedal 29 at the right end of the shaft 20 may cause movement of the clutch pedal instead of the brake pedal.

It will also be observed that while the device is shown as having but one shaft 20 and one auxiliary pedal 29 and one pedal connector 22, the device may be manufactured with two holes 17 in the bracket 16 for reception of two shafts 20 alongside each other with one of the shafts having a pedal 29 and a pedal connector 22 connected to the brake pedal of the automobile, whereby that shaft and its auxiliary pedal 29 may be used for braking, and the second shaft having a pedal 29 and a pedal connector 22 connected to the clutch pedal of the automobile, with the result that movement of the pedal 29 of the second shaft may be relied upon for movement of the clutch pedal of the automobile.

It will also be observed that where a bracket 16 is formed with two holes for two shafts, the entire construction may be formed in such a way that the bracket may be used with but one shaft for brake control, or with two shafts, one for brake control and the other for clutch control, the selection being left to the user of the device.

Now having described the device herein shown, reference should be had to the claim which follows:

A loosely mounted dual pedal control device for an automobile comprising two separate units, the first unit including two heavy plates connected by a hinge, one adapted to rest on the horizontal floor of an automobile and the other adapted to rest on the inclined floor board, with the hinge at the intersection of the two floor parts of the automobile, the second plate having a vertical plane bracket formed with a transverse horizontal hole, the second unit including an elongated shaft having a right end adapted to be received and thus fulcrumed in the hole of the bracket and having a brake pedal thereon, and a left end formed with means for detachably clamping it to a conventional pedal stem, whereby the brake pedal at the right end of said shaft may be pressed down by a passenger, when the right end of the shaft is in the bracket hole and the bracket rests in place on the automobile floor, and when the left end of the shaft is clamped to the pedal stem, for moving the pedal stem.

References Cited in the file of this patent
UNITED STATES PATENTS

| | | |
|---|---|---|
| 1,889,685 | McIntyre | Nov. 29, 1932 |
| 2,078,324 | Griffiths | Apr. 27, 1937 |
| 2,395,280 | Law | Feb. 19, 1946 |
| 2,562,700 | Curtenius | July 31, 1951 |
| 2,599,376 | Ehrenberg | June 3, 1952 |
| 2,677,976 | Berman | May 11, 1954 |